UNITED STATES PATENT OFFICE.

LUIGI FERRARI CORBELLI, OF FLORENCE, GRAND DUCHY OF TUSCANY, AND VINCENT RIATTI, OF THE DUCHY OF MODENA, ASSIGNORS TO L. F. CORBELLI AFORESAID.

IMPROVEMENT IN MANUFACTURE OF ALUMINIUM AND CALOMEL.

Specification forming part of Letters Patent No. 21,923, dated October 26, 1858.

*To all whom it may concern:*

Be it known that we, LUIGI FERRARI CORBELLI, of Florence, in the Grand Duchy of Tuscany, Commander of the Order of Malta, and VINCENT RIATTI, of the Duchy of Modena, have invented an improved process for extracting aluminium from its compounds and obtaining at the same time protochloride of mercury; and we do hereby declare that the following is a full and exact description of the said invention.

The chief object of this invention is to obtain aluminium in a simpler and much more economical manner than by the process heretofore employed for that purpose. The invention also applies to the manufacture of protochloride of mercury. In order to obtain aluminium by the improved method, we take of rock-alum five thousand nine hundred and thirty-one parts, and of chloride of calcium two thousand and seventy-six parts; or of rock-alum five thousand nine hundred and thirty-one parts, and chloride of sodium two thousand one hundred and ninety parts; or of sulphate of alumina four thousand one hundred and sixty-seven parts, and chloride of calcium two thousand and seventy-six parts; or other salts having aluminium for their base may be substituted for those above mentioned. One of these mixtures, well dried and pulverized, is to be placed in a suitable receptacle, which must not be made of metal, and to it must be added about two and one-half times its weight of water, in which it is to be dissolved and allowed to settle. It is then to be filtered and the liquid placed in a vessel composed of a material which is a non-conductor of electricity and containing mercury in a fluid state. A weak current of electricity is now to be passed through the mercury and the filtered liquid, for which purpose an insulated iron wire is introduced into the vessel and brought into contact with the mercury at the bottom of the vessel. This iron wire is brought into communication with the positive pole of a galvanic battery, the negative pole of which communicates with a plate of zinc immersed in the filtered liquid, but suspended so as not to touch the mercury. A galvanic action being now set up, the salt of alumina will be decomposed and the aluminium will be deposited upon the zinc plate either in the form of a blackish powder or in a thin compact sheet. During this operation the chlorine will be set at liberty, and, having a great affinity for mercury, it will combine with that metal and form therewith protochloride of mercury, (commonly known in commerce as "calomel,") which will be found deposited on the surface of the mercury at the bottom of the vessel.

Having thus set forth the improved mode of extracting aluminium from its compounds, we wish it to be understood that we do not claim, broadly, the employment of galvanic precipitation in the manufacture of aluminium; but What we do claim as our invention, and desire to secure by Letters Patent, is—

The process herein described of manufacturing at the same time aluminium and protochloride of mercury by means of galvanic precipitation, as set forth.

In witness whereof we, the said LUIGI FERRARI CORBELLI and VINCENT RIATTI, have hereunto set our hands and seals this 3d day of April, 1858.

LUIGI FERRARI CORBELLI. [L. S.]
V. RIATTI. [L. S.]

Witnesses:
    EMILIE MASI,
        *Of Leghorn.*
    BENEDETTO DALLACASA,
        *Of Florence.*